Patented Mar. 12, 1935

1,994,050

UNITED STATES PATENT OFFICE 1,994,050

WATERPROOF GLUE PRODUCT AND METHOD OF MAKING THE SAME

Teikichi Satow, Tokyo, Japan

No Drawing. Application January 9, 1930, Serial No. 419,732

4 Claims. (Cl. 87—17)

This invention relates to a waterproof glue product and method of making the same, wherein a proteidal substance forms the base ingredient, and which is rendered more effectively adhesive and more resistant to the action of water, in accordance with the present invention, by the use of formaldehyde or equivalent reaction retarding agents.

The object of the invention is to produce an efficient and cheap glue composition having the quality of great adhesiveness, and which is strongly resistant to the action of water.

In the manufacture of waterproof glue from proteidal substances, whether of vegetable or of animal origin, such as soya bean flour, casein, or the like, as heretofore carried out, the proteidal substance has ordinarily been glutinized, by means of an alkali, and rendered insoluble in water by calcium hydroxid. In some instances carbon disulphid has been added to the alkali in order to improve the adhesive characteristic of the glue product. The processes referred to, however, are open to various and serious theoretical as well as practical disadvantages. When the proteidal base substance, such, for example, as soya bean flour, casein, or the like, is treated with caustic alkali, or other alkaline re-agent, the principal protein constituent of the proteidal substance, namely, glycinine, is converted into alkali glycinate which imparts the quality of water solubility and adhesiveness to the mass. In fact, the adhesive character of the glue product, derived from soya bean flour, or other proteidal substance, is due to the action of alkali glycinate. However, when this alkali glycinate is treated with calcium hydroxid a double decomposition takes place resulting in the production of calcium glycinate which is insoluble in water. Calcium glycinate, however, is very much weaker in adhesive strength than is calcium caseinate. This fact has been established by me as a result of long and careful research, investigation of, and experimentation with these calcium compounds. It is by reason of the weaker adhesive characteristic resulting from the production of calcium glycinate in the base mass that glue made from soya bean meal is weaker in strength than that made from casein, the latter article possessing an average shearing strength of more than 500 pounds per square inch, whereas the soya bean meal glue product ordinarily possesses an average shearing strength of from only 150 to 250 pounds per square inch.

It is among the special purposes of my present invention, in a more specific application of the principles thereof, to produce a more efficiently waterproof glue product having a much stronger adhesive quality, employing soya bean meal or flour as a base therefor, than has heretofore been achieved.

I have discovered that, in the manufacture of glue from soya bean meal, if the glycinine, which is the main constituent of soya bean proteid, is converted into methylene compounds a maximum binding or adhesive strength, as well as a maximum water resisting property, is imparted to the resulting glue product. I have found, in the comparison of the water resisting and adhesive characteristics of the two glycinates, that is, methylene glycinate, and calcium glycinate, the former imparts to the glue product an adhesive or binding power about double that of the latter and approximately three times the water resisting or insolubility power thereof in water. Therefore, in accordance with my invention, in order to obtain the best glue product by the use of soya bean flour, the main constituent of the proteid contained in the flour, namely glycinine, is converted into methylene compounds.

Ordinary formaldehyde is frequently employed, as a suitable re-agent, for the production of active methylene compounds, and it has been used as a condensing agent in the manufacture of plastic products from soya bean proteid to convert the soluble alkali glycinate into insoluble waterproofing products. In the manufacture of glue, however, if ordinary formaldehyde is added to the adhesive fluid of the glutinized proteid the fluid will immediately be coagulated into a non-adhesive coagulant which renders the mass valueless and useless for the purpose of a glue product. For the same reason, and because of the same coagulating action, formaldehyde cannot be employed in the production of a glue product from a proteid material of animal origin, such as casein.

Heretofore calcium hydroxid has been used to convert soluble proteid into insoluble form, and, even in this use of calcium hydroxid, it has been necessary in order to maintain the fluid and viscous constituency of the glue products, even for a few hours, in such a state as to enable the glue product to be used, it has been necessary to add sodium fluorid, sodium triphosphate, or borax, in order to retard the coagulating action of the calcium hydroxid upon the proteid.

In accordance with my present invention I have discovered that by the use of certain substances, as hereinafter set forth, the coagulating action of formaldehyde upon the proteidal base substances employed in the manufacture of glue may be greatly retarded, thereby maintaining the mass for a prolonged period of time in a fluid condition suitable for its use as a glue product.

I have discovered that the mixtures of formaldehyde with ammonia, or the compounds of amides with active methylene compounds, will accomplish the desired retardation of the coagulating action of the formaldehyde, enabling me to produce a very satisfactory glue product capable of meeting fully the requirements of such product and possessing in many respect far superior qualities and characteristics of water insolubility and adhesiveness than are possessed by glue products heretofore obtained from proteidal substances.

I have discovered that when proteidal substances are acted upon by formaldehyde mixed with ammonia, a chemical reaction takes place during which a great amount of heat is evolved. When the mixture is maintained under pressure and heat the reaction proceeds until hexamethylen-tetra-amin is formed, which, however, does not react on the proteid in the alkaline mass. However, if the mixture is maintained under ordinary atmospheric pressure and at a moderate temperature, such for example as from 40° C. to 50° C., an intermediate product between formaldehyde and ammonia is produced, such as mono-methylene amide, dimethylene amide, or tri-methylene amide. These are not stable compounds and, therefore, when mixed with a proteidal substance they act to gradually generate free active formaldehyde. I have found it to be a fact that when a concentrated ammonia solution, of say 18% to 20% is mixed with one-third of its amount of formaldehyde solution of 35% strength known as formalin a great amount of reaction heat is evolved and the strong pungent odor of formaldehyde decreases remarkably, and there are obtained reaction products having greatly different phenomena and reaction characteristics when proteidal substances are subjected to the action thereof, as compared with the phenomena and reactions resulting from the action of a mere formaldehyde solution upon such proteidal substances. This is particularly true when soya bean meal is employed as the base proteidal substance. For instance, if free formaldehyde solution be mixed with a viscous and adhesive mass of alkaline glycinate, coagulation immediately takes place. But when a solution of formaldehyde and ammonia is mixed with such a viscous and adhesive mass of alkalin glycinate the intermediate reaction products above described are produced and no change in the viscosity of the mass will take place for a long period of time, such mass retaining its fluidity and viscosity from six to ten hours. It is only after the lapse of eight or ten hours that the mass gradually begins to harden. This retardation of the coagulating action is a most important, valuable, and desirable property of a glue product, and affords ample time for the product to be employed and applied for the commercial purposes for which its use is desired. The mixture of the intermediate reaction products of formaldehyde and ammonia, sometimes together with some free ammonia and some free formaldehyde that may be produced in the formation of said products, in their reaction in the mass, fully accomplish the effect of retarding the coagulating action of the formaldehyde. In other words, the ammonia prevents the coagulating reaction of formaldehyde upon the proteidal base substance and fulfills its purpose of a retardant of such action within the reaction sphere of formaldehyde upon proteid. It is to be observed that the ammonia is employed to control the coagulating action of the formaldehyde and is not employed as a glutinizing agent for the proteid.

I have discovered that sodium sulphite may be employed in place of ammonia for accomplishing the same retarding action. I have also found that formamazine, methylen-formamide, or methylencarbamide, or their equivalent, may be used in the same manner as above described with reference to the mixture of ammonia and formaldehyde for accomplishing the same purpose.

As a specific example of the use of my invention I take 100 parts by weight of raw soya bean flour which has been deprived of its oil, and mix therewith certain usual chemicals, such as —

|  | Parts |
|---|---|
| Sodium phosphate | 10 |
| Sodium fluorid | 5 |
| Calcium hydroxid | 7 to 10 |
| Calcium carbonate powder | 50 |
| Copper sulphate | 0.5 |
| Sodium chlorid | 2 |

These ingredients are thoroughly mixed together and pulverized to a fine powder of at least 100 mesh fineness. To this powdered mixture is added water, three times its weight, and the mass is then well stirred. There will be thus obtained a highly viscous adhesive fluid. To the mass is then added 5 to 10 parts of the reaction product, such as formaldehyde and ammonia. The temperature preferably of the mass is kept between 15° C. and 20° C. The glue product is then ready for use. It may be thus seen that I have produced with soya bean meal and an alkaline glutinizing agent, such as caustic soda and silicate of soda, calcium hydroxid, copper sulphate or its ammoniacal solution and a mixture of formaldehyde and ammonia, a most strong and waterproof glue having great spreading power and great resistance to the various tensile forces that may be applied to the products glued together. Added strength is also apparent in the direction of prevention of shearing. The copper sulphate which I have above talked of as being used in the mixture may, of course, be used in two different ways, that is it may be used as a dry powder, i. e. mixed in dry soya bean meal, or it may be also used as a solution made up of copper sulphate dissolved in an excess of ammonia. Of course when copper sulphate is treated with water and ammonia there is naturally produced an ammoniacal copper solution. The two processes ultimately would, therefore, yield the same product, but it is necessary to note that the process wherein the copper sulphate is brought into chemical activity with the other compounds by way of solution is more effective.

The glue product thus obtained maintains its constituency unaltered for a period of six to ten hours and is easily usable and workable for the purposes for which glue is ordinarily employed, for example, in the veneer trade.

It is to be understood, of course, that I am not to be bound strictly by the figures, chemicals, and illustrative examples recited but intend the scope of this invention to be coterminous with the breadth of the claims hereto attached. It is, of course, apparent that according to the difference in glues the chemicals and figures and illustrative examples given are variable; for instance, any glutinizer such as ammonia, caustic soda and silicate of soda, or sodium carbonate may be used instead of sodium phosphate or sodium fluorid; or ammoniacal copper solution may be used instead of copper sulphate. In some cases calcium carbonate powder and sodium chlorid are not required in the formula.

The formaldehyde acts gradually after the glue product has been applied for use and during the time the veneered wood product, for example, is kept in a drying room. The glue develops its great binding strength within twenty-four hours, whereas the glues at present in use require a week's time for this result to be attained. Within twenty hours after the application of my glue product it attains a shearing strength in the dry state of from 380 to 480 pounds per square inch and from 200 to 250 pounds per square inch in the wet test. Even after a veneered product to which my glue has been applied has been immersed in boiling water for a period of twenty-five hours the glue retains its firm adhesiveness and binding power without disclosing any defects. These considerations attest the superior qualities of my glue product over glues heretofore employed.

After the elapse of one week from the application and use of my glue product the indurating effect of the formaldehyde will have developed to its fullest extent resulting in the production of a very strong water resisting, as well as very great binding characteristics, the shearing strength attained within that period being from 500 to 550 pounds per square inch.

If desired and in order to increase the strength, as well as the waterproofing property of the glue, furfural resin produced by boiling furfural with ammonia or caustic alkali may be added during the mixing operation.

While I have described my invention, in the specific example hereinabove given, as applied to the production of a glue product from soya bean proteid it is, of course, to be understood that my invention in its broadest scope is not to be limited to its use with soya bean meal or flour, as its base material, but is capable of use and application in connection with the manufacture of glue products from other sources of vegetable proteids, as well as from casein, and other proteidal substances.

Having now set forth the objects and nature of my invention and an illustrative method of carrying out the same, what I claim as new and useful and of my own invention and desire to secure by Letters Patent is:

1. An adhesive composition including a proteidal base substance, massed with an intermediate reaction product of formaldehyde and ammonia.

2. In the manufacture of adhesive substances the process of subjecting a glutinized protein to the action of formaldehyde and ammonia at atmospheric pressure and a temperature of the order of 40 degrees C.

3. In the manufacture of protein adhesives the process of retarding the coagulating action of formaldehyde on protein which consists in adding ammonia in mixture with formaldehyde to a protein containing substance under pressure and temperature conditions which cause the formation of unstable amide compounds.

4. In the manufacture of adhesives the process comprising mixing at atmospheric pressure and under moderate temperatures a protein containing base and a mixture of approximately a 35% solution of formaldehyde and approximately an 18% solution of ammonia in the proportion of the order of one to three respectively.

TEIKICHI SATOW.